US012694730B2

(12) United States Patent
Donini et al.

(10) Patent No.: US 12,694,730 B2
(45) Date of Patent: Jul. 28, 2026

(54) SYSTEM AND METHOD FOR COMMUNICATION OF AUTOMATED CONTROL SYSTEM DIAGNOSTICS

(71) Applicant: Deere & Company, Moline, IL (US)

(72) Inventors: Mario L. Donini, Moline, IL (US); Daniel Quinn, Moline, IL (US); Carolyn Herman, Moline, IL (US); Brittany Holthausen, Moline, IL (US); Timothy J. Ofenloch, Moline, IL (US); Matthew T. Wold, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/810,094

(22) Filed: Aug. 20, 2024

(65) Prior Publication Data

US 2025/0218232 A1 Jul. 3, 2025

Related U.S. Application Data

(60) Provisional application No. 63/616,996, filed on Jan. 2, 2024.

(51) Int. Cl.
*G07C 5/08* (2006.01)
*G07C 5/00* (2006.01)

(52) U.S. Cl.
CPC ........... *G07C 5/0825* (2013.01); *G07C 5/008* (2013.01); *G07C 5/0808* (2013.01)

(58) Field of Classification Search
None
See application file for complete search history.

(56) References Cited

U.S. PATENT DOCUMENTS

| | | | | |
|---|---|---|---|---|
| 8,161,718 B2 | 4/2012 | Bussmann et al. | | |
| 11,175,669 B2 * | 11/2021 | Nagata | .............. | B60W 60/0015 |
| 12,415,525 B1 * | 9/2025 | Automata | ......... | B60W 50/0205 |
| 2015/0266490 A1 * | 9/2015 | Coelingh | .......... | B60W 60/0059 701/30.5 |
| 2020/0114843 A1 | 4/2020 | Foster et al. | | |
| 2020/0128737 A1 | 4/2020 | Anderson et al. | | |

(Continued)

OTHER PUBLICATIONS

Extended European Search Report and Written Opinion issued in European Patent Application No. 24210533.6 dated Apr. 17, 2025, in 07 pages.

*Primary Examiner* — Arslan Azhar
(74) *Attorney, Agent, or Firm* — Crowell & Moring LLP

(57) ABSTRACT

A system and method for providing diagnostic information to an end user of an off-road vehicle, such as a combine, is provided. A set of sensors required for an automated system of the off-road vehicle to function at different predetermined automated system functional levels and a display device accessible to the end user is included. A processor in communication with the set of sensors and the display device, cooperates to present a simplified automation status for the off-road vehicle. A memory in communication with the processor stores computer readable instructions for the processor to evaluate an operational status of the sensors, determine the operational status of any required sensor, and determines whether the evaluated operational status of any required sensor is equal to or greater than a threshold required for a lower functional level. A maximum functional level of the required sensor is displayed on the user interface.

20 Claims, 15 Drawing Sheets

(56) References Cited

U.S. PATENT DOCUMENTS

| | | | | |
|---|---|---|---|---|
| 2020/0367434 | A1 | 11/2020 | Nakabayashi et al. | |
| 2022/0388530 | A1* | 12/2022 | Patne | G01C 21/28 |
| 2023/0061274 | A1 | 3/2023 | Blank et al. | |
| 2023/0311929 | A1* | 10/2023 | Laws | B60W 50/029 701/23 |

* cited by examiner

| | 400 | 402 | 404 |
|---|---|---|---|
| | Ground Speed Automation | Harvest Settings Automation | Terrain Settings Automation |
| 410 Act | Ground Speed Adjustment | Harvest Settings Adjustment | Terrain Settings Adjustment |
| 408 Decide | Ground Speed Algorithm | Harvest Settings Algorithm | Terrain Settings Algorithm |
| 406 Sense | Forward Cameras<br>Satellite Views<br>Grain Loss Sensors<br>Mass Flow Sensor<br>Rotor Drive Pressure Sensor<br>Terrain Map<br>Pitch Sensor | Grain Cameras<br>Grain Loss Sensors<br>Mass Flow Sensor<br>Pitch Sensor | Pitch Sensor |

FIG. 4

| | 700 Blue LED | 702 Green LED | 704 Amber LED | 706 Red LED | 708 Clear LED / Off |
|---|---|---|---|---|---|
| 406 Act | System acting for you. | System ready to act for you. System waiting for engagement /trigger. | System could be doing a better job acting for you. User take action to resolve. | Fault –system is not acting for you. User must act to complete task. | System off or not supported (eg.: not supported for crop type, condition, etc). Use must act to complete task |
| 408 Decide | System deciding for you. | System ready to decide for you. System waiting for engagement . | System could be doing a better job deciding for you. User take action to resolve. | Fault –system is not deciding for you. User must decide to complete task. | System off or not supported (eg.: not supported for crop type, condition, etc). Use must act to complete task |
| 410 Sense | System sensing for you. | System ready to sense for you. System waiting for engagement /trigger. | System could be doing a better job sensing for you. User take action to resolve. | Fault –system is not sensing for you. User must sense to complete task. | System off or not supported (eg.: not supported for crop type, condition, etc). Use must act to complete task |

FIG. 7

SYSTEM AND METHOD FOR COMMUNICATION OF AUTOMATED CONTROL SYSTEM DIAGNOSTICS

CROSS-REFERENCE TO RELATED APPLICATIONS

This application claims the benefit of U.S. Provisional Patent Application No. 63/616,996, filed Jan. 2, 2024, entitled SYSTEM AND METHOD FOR COMMUNICATION OF AUTOMATED CONTROL SYSTEM DIAGNOSTICS, the entirety of which is hereby incorporated by reference herein.

BACKGROUND

1. Technical Field

This application relates to user-automation interfaces and, in particular, to display of automated control system diagnostics to users of vehicles.

2. Related Art

Vehicles may include one or more automated systems to control one or more functions of the vehicle. These automated systems may include a computer system designed for one or more specific control functions of, or within, the vehicle. The computer system may be embedded as part of a system or sub-system that controls a function of the vehicle. Examples of the system or subsystem include an engine, an air conditioner, a fertilizer spreader, a combine harvester, a crop sprayer, a tractor, any type of farm machinery, an automobile, any type of vehicle, or any other system, subsystem, or device. The automated system may include data that is obtained from one or more sensors, is a status or a setting of a device, or is otherwise related to the embedded system.

SUMMARY

In one embodiment, a method for providing diagnostic information to an end user of an off-road vehicle is disclosed. The method includes determining a set of sensors or components that are required for an automated system of the off-road vehicle to function at each of a plurality of predetermined automated system functional levels and evaluating an operational status of the determined set of sensors or components. The method also includes determining whether the evaluated operational status of any required sensor or components falls below a first threshold required for a higher functional level and determining whether the evaluated operational status of any required sensor or component is equal to or greater than a second threshold required for a lower functional level. Furthermore, the method includes displaying or indicating to the end user a maximum functional level of the required sensor or components of the automated control system among the higher threshold and the lower threshold. In different implementations, the method may further include generating an alert message on a user interface of the off-road vehicle when the maximum functional level of the implement system is lower than required for a proper minimum functional level, as well as disabling the automated control system when the maximum functional level of the implement system is lower than required for a proper minimum functional level.

In another embodiment, a system for providing diagnostic information to an end user of an off-road vehicle is described. The system may include a set of sensors that are required for an automated system of the off-road vehicle to function at each of a plurality of predetermined automated system functional levels. The system may also include a display device accessible to the end user, as well as a processor in communication with the set of sensors and the display device. A memory may be in communication with the processor and storing computer readable instructions executable by the processor for providing the diagnostic information. The processor may be configured by the computer readable instructions to evaluate an operational status of the sensors and to determine whether the evaluated operational status of any required sensor falls below a first threshold required for a higher functional level. The processor may be further configured to determine whether the evaluated operational status of any required sensor is equal to or greater than a second threshold required for a lower functional level. Also, the processor may be configured to display on the display device to the end user a maximum functional level of the required sensor or components of the automated control system among the higher threshold and the lower threshold.

In yet another embodiment, a non-transitory computer-readable storage medium comprising instructions executable by a processor for providing diagnostic information to an end user of an off-road vehicle is disclosed. The storage medium includes instructions executable to determine a set of sensors or components that are required for an automated system of the off-road vehicle to function at each of a plurality of predetermined automated system functional levels, as well as instructions executable to evaluate an operational status of the determined set of sensors or components. The storage medium may include instructions executable to determine whether the evaluated operational status of any required sensor or components falls below a first threshold required for a higher functional level, and instructions executable to determine whether the evaluated operational status of any required sensor or component is equal to or greater than a second threshold required for a lower functional level. Additionally, the storage medium may include instructions executable to display or indicate to the end user a maximum functional level of the required sensor or components of the automated control system among the higher threshold and the lower threshold.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 4 illustrates an example of a set of automated functions that may be implemented on the combine and computing systems of FIGS. 1-3 in the context of a sense-display-act paradigm for breaking up the automated functions;

FIG. 7 illustrates a LED color display key for each of a plurality of different colors that may be shown in the user interface of the combine to represent a particular operating status of an automated function or aspect of the automated function;

DETAILED DESCRIPTION

Figure 1:
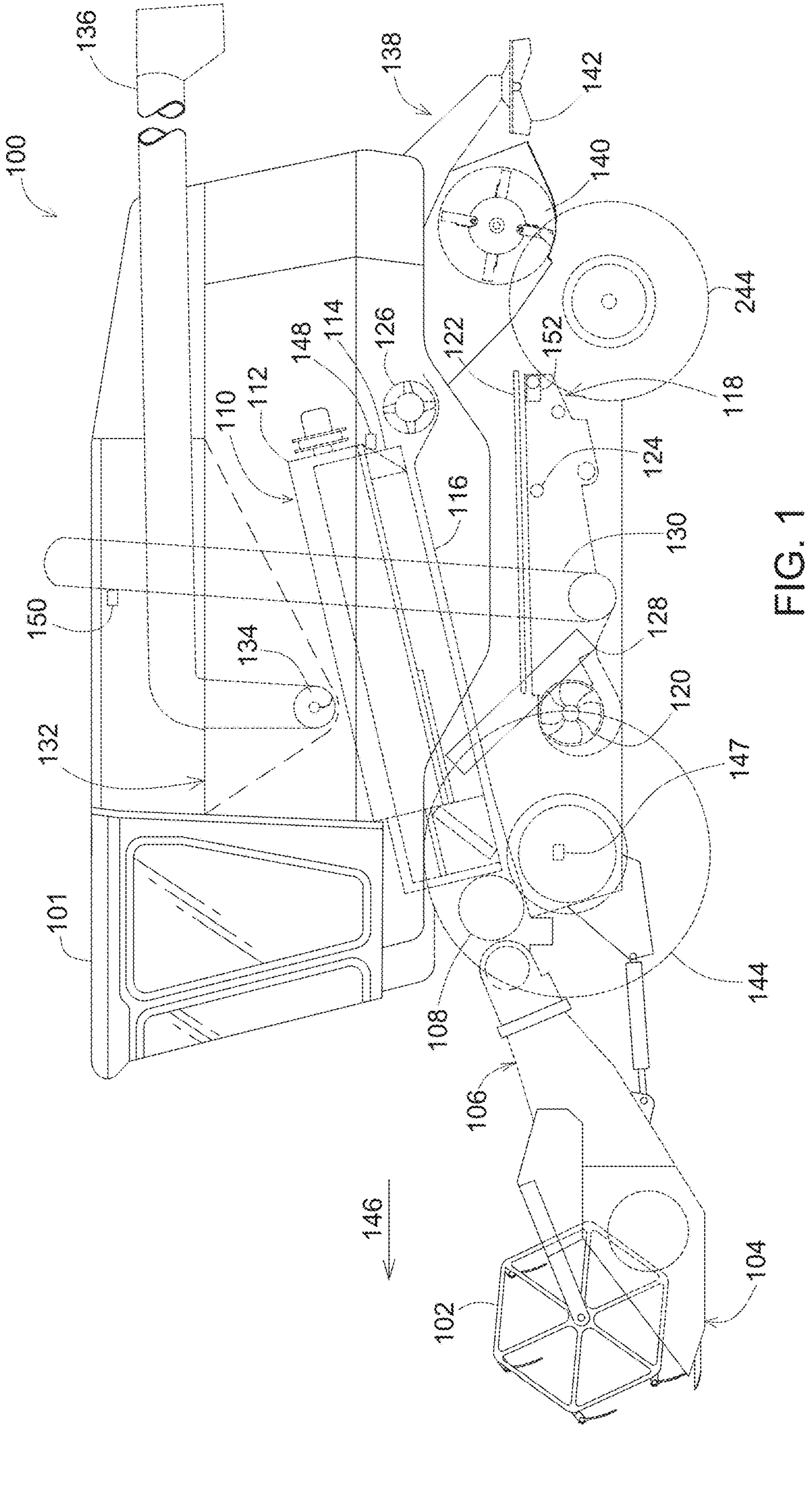
FIG. 1 is a partial pictorial, partial schematic illustration of a combine harvester.

Due to the complexity of some vehicular systems, automation is often included to assist a human operator. The automation may provide human operators of a vehicle the option to hand-off partial or complete control over certain functions of the vehicle to a computerized control system. Automation can reduce workload and fatigue for a vehicle operator, increase workload efficiencies, and allow the operator the freedom to focus on other functions or switch between functions. There may be instances where an operator relies too heavily on automation to handle certain functions and becomes complacent. Complacency or over-reliance on automated systems for a vehicle may result in disappointment when automation does not perform as expected, and can allow a mistrust of the automation to develop. To better address potential misunderstanding or misinterpretation of current automated system performance capabilities, systems and methods for communication of automated control diagnostics are disclosed.

As part of improving the use of automated systems by operators of vehicles, the disclosed systems and methods are configured to instill better information flow of moment-to-moment changes in reliability for a particular automated system in a vehicle. By improving communication and clarifying information flow between operators and automated systems, it is expected that a better overall outcome for vehicle operations may be achieved. Tasks for an automated system on a vehicle may include information acquisition (gathering data pertinent to a task), information analysis (making measurements/determinations based on the acquired information), decision selection (choosing a course of action based on the acquisition and analysis), and action implementation (making adjustments to the vehicle). As one way of improving communication of automated system control diagnostics, including better transparency of the automated system status, but with simplification to avoid overwhelming a human operator with too much information, the system and method disclosed herein illustrate a three-stage visual diagnostic of sense, decide and act. The sense diagnostic representing a combination of the status of the information acquisition and information analysis portions of an automated process, the decide diagnostic representing the decision selection status of a given automated process, and the act diagnostic representing the adjustment status for that automated process. As set out in greater detail below, in one embodiment, the sense aspect of automated functions is tied to the status, performance, and/or availability of information from, the sensors associated with the vehicle, the decide aspect of automated functions is tied to status, performance, and/or availability of decision systems associated with the vehicle (e.g., any computational component or system of components such as any algorithm, processor, etc. of the vehicle), and the act aspect of automated functions is tied to the status, performance, and/or availability of vehicle behavioral systems or components, for example motors, pumps, sprayers and etc. that interact with the speed, orientation or action of the vehicle and attachments to the vehicle.

Although the systems and methods will be discussed herein using the example of an automated harvesting system, such as the combine harvester example shown below, other vehicles with automated systems are contemplated. For example, all automation domains (e.g., agriculture, construction, road building, etc.) may incorporate the automated control diagnostic systems and methods discussed herein, and differing use environments (i.e., onboard and remote/offboard) are contemplated.

Referring to FIG. 1, an example of combine harvester vehicle 100 incorporating automated systems is disclosed. FIG. 1 is a partial pictorial, partial schematic, illustration of an agricultural machine 100, in an example where the machine 100 is a combine harvester (also referred to herein as a combine). It can be seen in FIG. 1 that combine 100 illustratively includes an operator compartment 101, which can have a variety of different operator interface mechanisms, for controlling combine 100, as will be discussed in more detail below. Combine 100 can include a set of front-end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a long range navigation (LORAN) system, or a wide variety of other systems or sensors that can provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
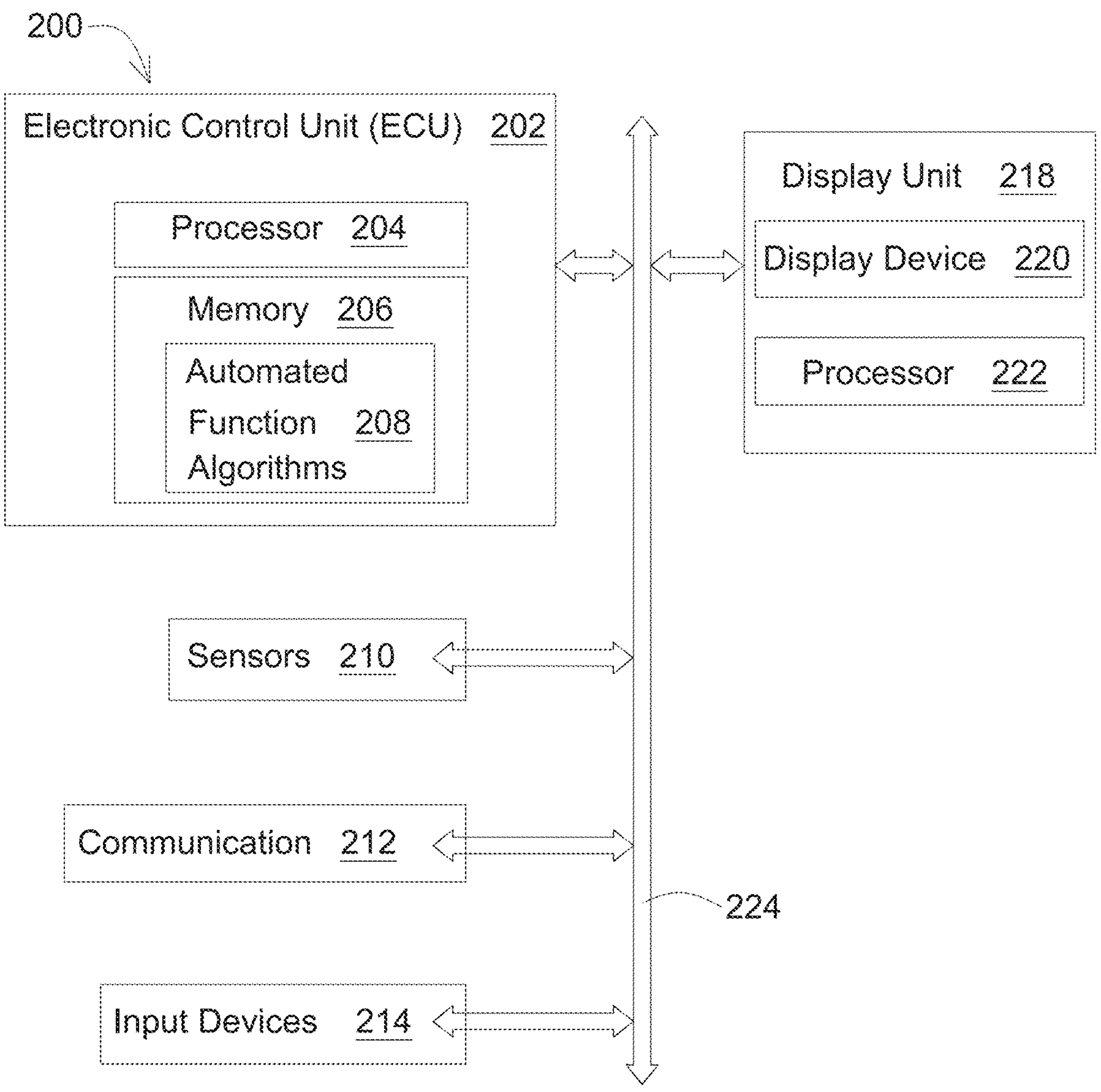
FIG. 2 shows a schematic diagram of an example embodiment of a computing system configured in accordance with subject matter disclosed herein.

The combine 100 may incorporate an electronic system 200 such as is shown in FIG. 2. The electronic system may include one or more electronic control units (ECU) 202 that help to control various functions on the combine 100. Each ECU 202 may include a processor 204 and memory 206, where the memory 206 may be any of a number of types of volatile and/or non-volatile memory for storing data and automated function algorithms 208 necessary to operate the function(s) assigned to the ECU 202. The memory 206 may include non-volatile and/or volatile memory, such as a random access memory (RAM), a read-only memory (ROM), an erasable programmable read-only memory (EPROM), or a flash memory. Alternatively or in addition, the memory 206 may include an optical, magnetic (hard-drive), flash drive or any other form of data storage device.

The electronic control unit 202 may be any embedded system that controls one or more electrical systems or subsystems in a vehicle or in an attachment to a vehicle. The electronic control unit (ECU) 202 may be hardware and/or a combination of hardware and software. Examples of the electronic control unit (ECU) 202 may include an Electronic/Engine Control Module (ECM), a Powertrain Control Module (PCM), a Transmission Control Module (TCM), a Brake Control Module (BCM or EBCM), a Central Control Module (CCM), a Central Timing Module (CTM), General Electronic Module (GEM), a Body Control Module (BCM), and a Suspension Control Module (SCM). The ECU 202 may include a processor 204 in communication with a memory 206. The memory may contain data and executable algorithms, such as automated function algorithms 208 usable by the combine 100 or other vehicle in which the ECU 202 is situated.

The electronic system 200 may also include sensors 210, such as the various combine sensors noted above, communication devices 212 such as transmitters or receivers for sending and receiving data wirelessly to remote devices or control stations, user input devices 214 for receiving combine operator inputs, and one or more display units 218 that have a display 220 visible to an operator to convey information such as the automated control system diagnostics discussed herein, as well as a processor 222 for controlling the display device(s) 220.

All of the various components of the electronic system 200 may communicate with one another over a central data bus 224 using one or more known device communication protocols. The vehicle data bus 224 may be a communications network that interconnects components of a vehicle, such as an automobile, a bus, a train, an industrial vehicle, an agricultural vehicle, a ship, or an aircraft. Alternatively or in addition, the vehicle data bus 224 may be a communications network that interconnects components of an attachment to a vehicle, such as a trailer or a vehicle-hitchable device. In some examples, the vehicle data bus 224 may have specialized features for vehicle control, such as assurance of message delivery, assured non-conflicting messages, assured time of delivery, relative low cost, resilience in the presence of electromagnetic fields, redundant routing, and/or other characteristics. The vehicle data bus 224 may include a specialized communications network that provides such specialized features. The vehicle data bus 224 may be a communications network designed to facilitate microcontrollers and devices to communicate with each other without a host computer. Examples of the vehicle data bus 224 may include a controller area network (CAN) bus, a local interconnect network (LIN), an ISO 9141 compliant network, a J1850 compliant network, and an Ethernet network.

Figure 3:
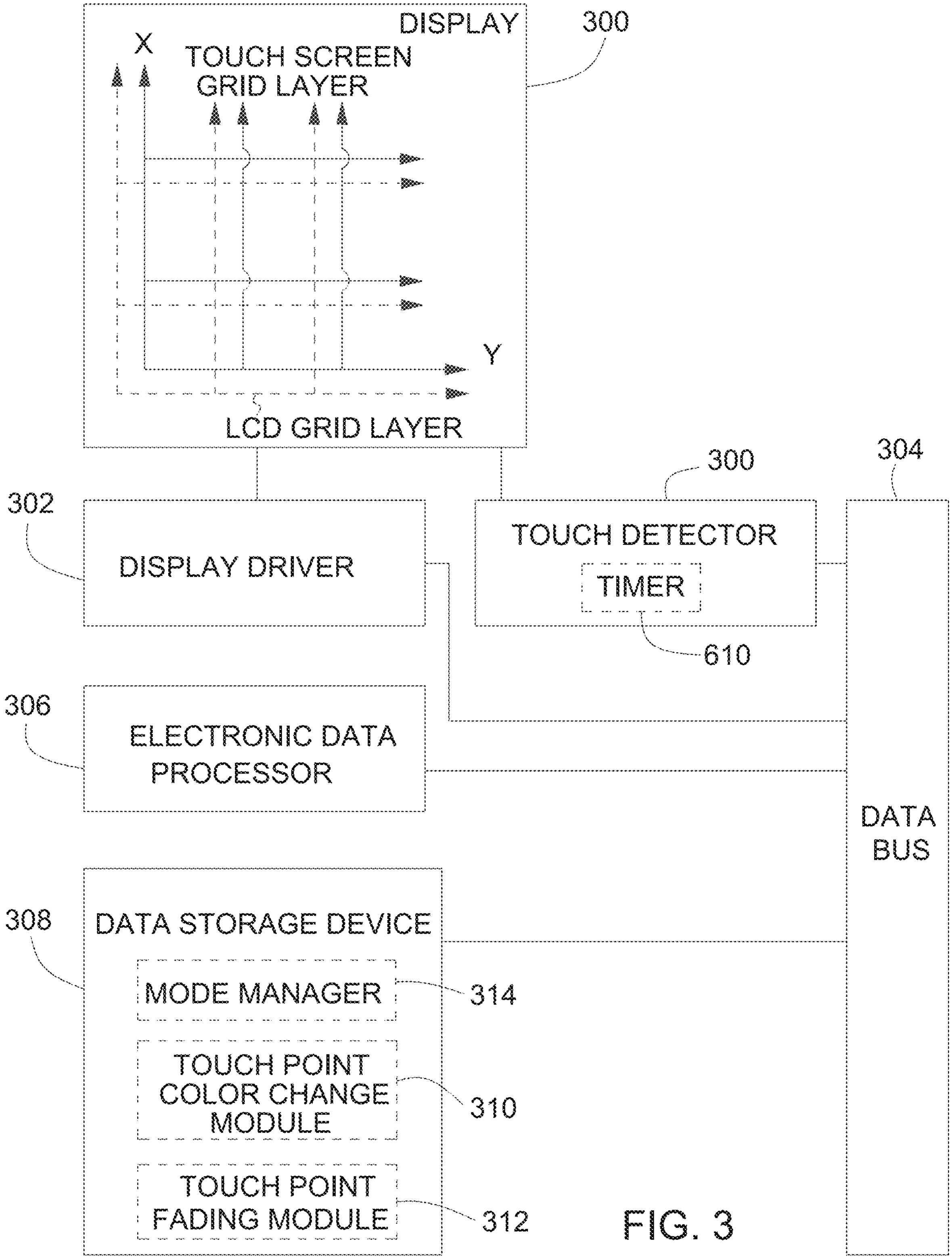
FIG. 3 shows a schematic diagram of an example embodiment of a computing system configured in accordance with subject matter disclosed herein.

As shown in FIG. 3, an exemplary embodiment of an active feedback interface for a touch screen display includes a touch screen-type display 300 having a sensor grid that may be used for the display device 220 noted above. The touch screen display 300 displays visual output (such as virtual buttons) to the user. The visual output may include graphics, text, icons, video, and/or any combination thereof (collectively termed "graphics"). In addition to providing a display function, the touch screen display 300 also provides an input interface and an output interface between the system 200 and the environment in which the system 200 is installed, such as the combine described above that is controlled by the operator via the system 200.

The touch screen display 300 includes a touch-sensitive surface that accepts input from an operator based on touch contact (e.g., a finger). The touch screen is operatively connected to display driver or controller 302, a data bus 304, and a processor 306, that control various functions that may be selected by a user through the touch screen display 300. A data storage device 308 may include, among other things, various modules having instructions related to characteristics of visual cues that are displayed on the display screen 300. In various exemplary embodiments, the data storage device 308 may include a touch point color change module 310 configured to control a change in color to an aspect of the display screen 300 as a visual cue to a user and a touch point fading module 320 configured to control a change in a visual cue as fading over a period of time. The modules 310, 312 may be controlled by a mode manager 314.

The combine 100 may provide a display of control system status information and diagnostics using a graphical use interface displayed on the touchscreen display 300. For a combine 100, there may be multiple different automated functions that assist an operator. As illustrated in FIG. 4, one embodiment of automated functions that may be implemented on combine 100 is illustrated in the context of the sense-display-act paradigm for breaking up automated functions noted previously. In FIG. 4, there are three separate harvest automation functions shown: a ground speed automation function 400, a harvest setting automation function 402 and a terrain settings automation function 404.

Each of the functions 400, 402, 404 is broken down by the automation components of sense 406, decide 408 and act 410. For ground speed automation 400, the sense component 406 includes tracking the status of the various sensors that measure and determine data needed/available for the function. In this example, the sense component 406 of ground speed automation 400 includes the forward cameras, satellite views, grain loss sensors, mass flow sensor, rotor drive pressure sensor, terrain map and pitch sensor of the combine 100. The decide component 406 of ground speed automation 400 includes an algorithm that processes the sensed data, and the act component 410 of ground speed automation 400 is the status of the automated acting/adjustment of that function. Different sensor readings and sensors, some of which may overlap with each other as a same sensor may contribute to decision making in more than one function, are monitored for each of the other functions 402, 404. Additionally, in other embodiments the combine 100 may include additional or different automated functions than the three noted above, and the number, type or distribution of the sensors associated in the sense component 406 may differ.

Figure 5:
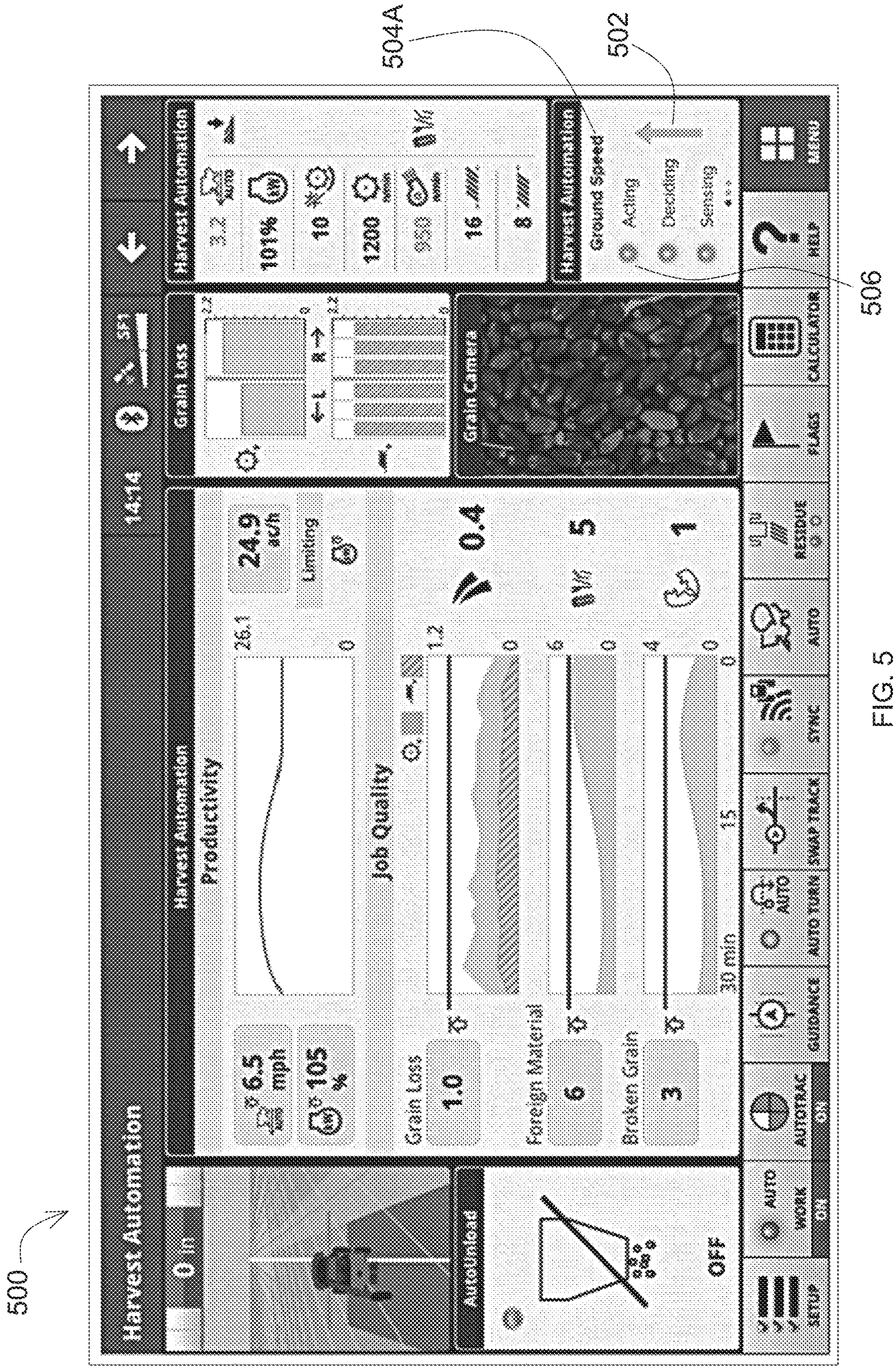
FIG. 5 illustrates an embodiment of a user interface that may be displayed to the operator of a vehicle, such as a combine, for controlling and/or monitoring multiple systems associated with the vehicle.

Referring to FIG. 5, a user interface 500 that may be displayed on a display such as touchscreen 300 is shown. The user interface 500 illustrates a display seen by the operator of the combine for controlling and/or monitoring multiple systems in the vehicle. The interface 500 provides buttons for different available functions and screen selection, such as system communication status, maps and orientation of the combine itself, a camera view of harvested grain, statistics on the various real-time and time-lapse data on vehicle status and desired ongoing harvesting session statistics. Included in the user interface 500 is a harvest automation status window 502 for displaying the sense, decide and act performance capabilities of a selectable one of the harvest automation functions available. This window 502 provides a compressed and simplified view of the status of a function of the harvest automation being run on the combine. The harvest automation function status shown in window 502 in the example user interface 500 of FIG. 5 is the ground speed function status window 504A. The ground speed function status window 504A shows the abridged status information for the ground sped automated function by way of a color indicator, here in the form of virtual LEDs 506 for each of the sensing, deciding and acting aspects of the automated function. As described in greater detail below, in one embodiment the virtual LEDs 506 may be groups of pixels on touchscreen 300 arranged with colors assigned to them associated with a determined status/condition of the aspect of the function that the virtual LED is positioned adjacent to on the display 300.

Figure 6:
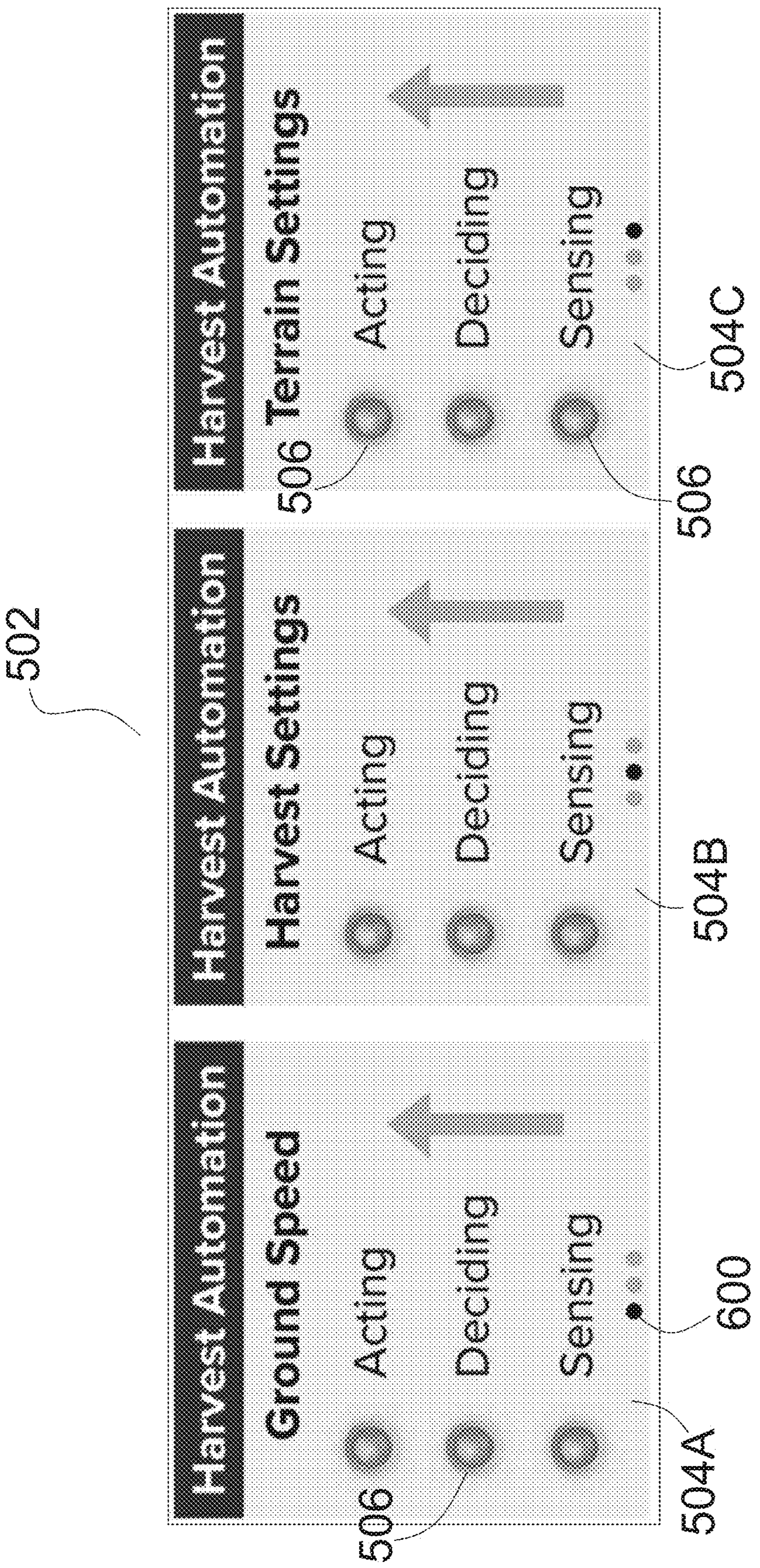
FIG. 6 illustrates a series of windows that may be presented in a portion of the user interface of FIG. 5, each window displaying the respective sense-decide-act status of a different automated function.

Additionally, as shown in FIG. 6, the harvest automation status window 502 may be a rotating window that rotates and/or is rotatable between a set of status windows for each of the available harvest automation functions identified above (ground speed function status window 504A, harvest setting function window 504B, and terrain setting function window 504C), where the position of the current function window relative to the remaining function windows may be shown by position dots 600. In different implementations, the window 502 may automatically rotate between the function windows 504A-C at a predetermined pace, may display on a current window until manually moved by selecting the position dot or swiping on the window 502, or may display a function window that has most recently received a status change to one of more of the sense-decide-act status identifying LEDs 506.

The LEDs 506 next to each of the function aspects (sense, decide, act) may be changeable by the electronic system 200 of the combine in accordance with detected status for each function aspect. As illustrated in FIG. 7, each of a plurality of different colors may be shown for the LEDs 506 to represent a different status for the identified function aspect (sense aspect 406, decide aspect 408 and act aspect 410). In the embodiment of FIG. 7, a blue LED 700 indicates that the system is performing the function aspect (acting, deciding or sensing) the LED is adjacent to. A green colored LED 702 indicates the system is ready to perform the function aspect but is awaiting to be triggered or engaged. An amber color LED 704 is indicative that the system could be doing a better job based on some issue or partial failure of the combines automated harvest system associated with the functional aspect. A red LED 706 indicates a fault to a sensor, a decide aspect or an act aspect of the function. Finally, an image of a clear or gray color LED 708 indicates that either the automated system is off, or that the functional aspect is not included or supported by the combine's systems. Each function aspect (sense, decide, act) for a particular function may have different status. For example, some sense aspect items may be faulted (red) and the decide aspect may have an issue/issues (amber) but the act aspect for the particular function may be still be blue (automating). Other sensors are still working (blue), decide is making some decisions but not the best decisions (amber), and action is still being taken (blue). Additionally, as operation continues and there could be the case where there are new or additional issues with the decide aspect, that could cause the act aspect to now change from blue to amber.

Referring again to FIGS. 5 and 6, each of the different function windows 504A-C that is available on the user interface 500 allows the user to select a more detailed view of the status and preference settings for that function. In one embodiment, the user may activate a harvest automation application (harvest automation app) by clicking on the function window 502 to reach a different screen. In one embodiment, activating/clicking-on the harvest automation application may produce a screen overlay or pop-up over the previous screen on the same display For example, as shown in FIG. 8, when an issue relating to a harvest function is discovered by the combine system 200, an optional alert message 802 may pop up on the user interface 500 and the function window 502 for the particular automated harvest function (here ground speed automation window 504A) with the changed status as a result of the detected situation prompting the alert message is illustrated.

Figure 8:
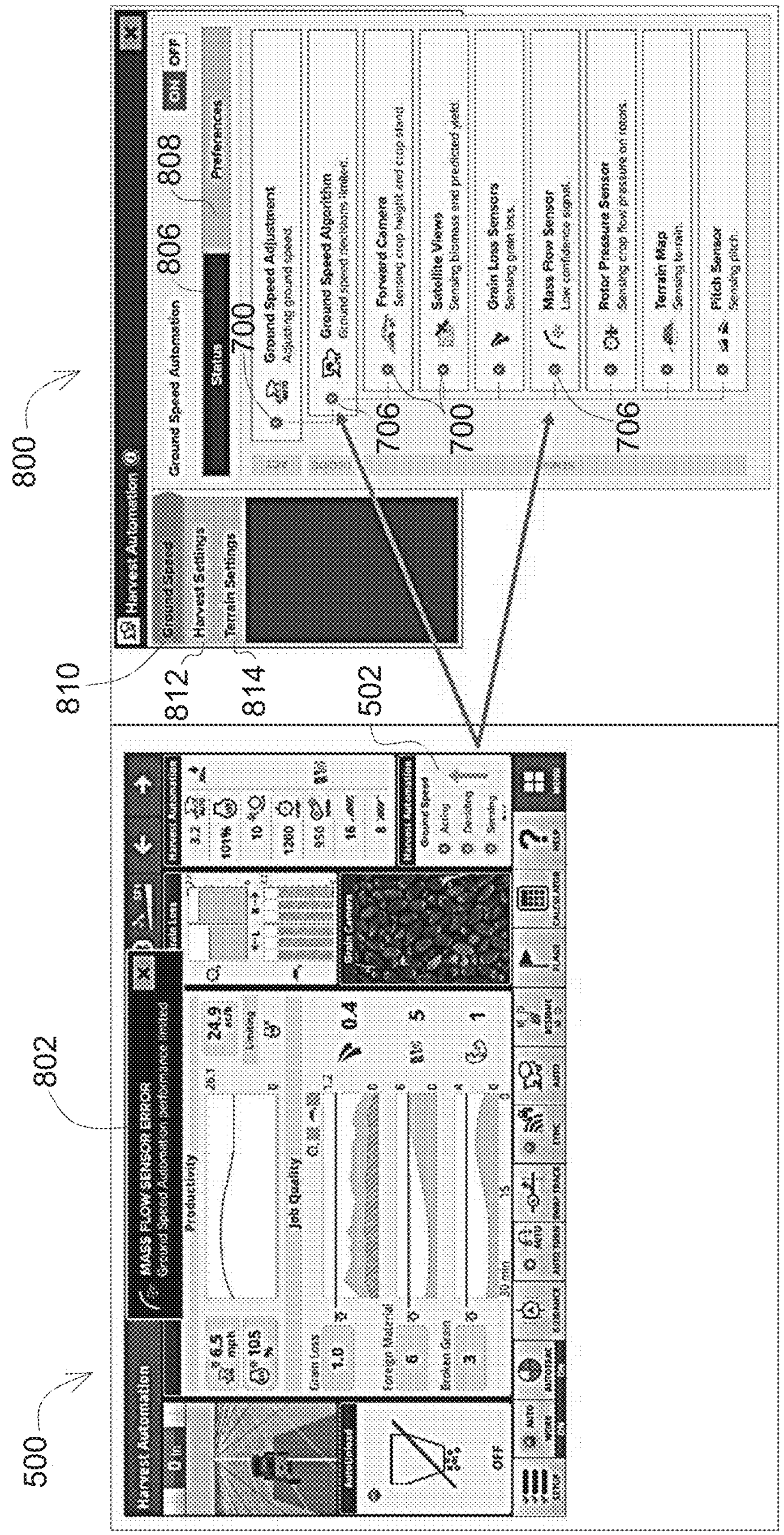
FIG. 8 illustrates an embodiment of a user interface display for a combine illustrating a window displaying basic status information for a particular automated function and an associated more detailed status window for that particular automated function accessible via operator selection of the basic status window.

The alert message 802 in FIG. 8 is for a mass flow sensor error and announces that the ground speed automation function may be limited. Other alert messages that overlay the interface and provide text and other details of the new issue detected in the automated control system are contemplated. Concurrently with the optional alert message 802, the function window for ground speed 504A is currently displayed on the user interface showing amber color LEDs 704 for the sensing and deciding function aspects affected by the issue that prompted the alert message-identifying working but not optimal performance in those to aspects of the ground speed automation function.

By the user then selecting the ground speed function window, for example by the operator using the touchscreen to touch the function window 502 in the interface 500 or using a mouse or pointer to click on the function window, the interface 500 can switch to display a harvest automation application window 800 that allows the operator to see more detail and a breakdown of the status 806 and preferences 808 for each function.

The harvest automation application window 800 provides a visual and actionable expanded list of slightly more detailed textual and visual operation status information for the various functional aspects (sensing/deciding acting) that were illustrated in the abridged three LED format on the automated function window 502 of the more general interface 500. The harvest automation application window 800 may replace the interface 500 on the user display, be overlaid over the interface 500, or the user interface and harvest automation application window 800 may be scaled by the system to concurrently display side-by-side on the user display in alternative embodiments.

The harvest automation application window 800 includes a panel of three function selector buttons (ground speed 810, harvest settings 812, terrain settings 814) to switch between the more detailed status information screens for each of the three functions in this example, as well as the various selectable act, decide and sensor display regions within each selected automated function. In this example, the act and decide function aspects for the ground speed automation 810 include single display and selection regions with an LED indicator and some text on the status, as well as seven display and selection regions for sensors on the combine that are used by the currently selected ground speed automation function. In the embodiment of FIG. 8, the display and selection regions for the sensors of the harvest automation app 804 each have a virtual colored LED showing the color of the status for that sensor using the format noted in FIG. 7. Additionally, each display and selection regions has a text and an icon identifier for the sensor and a short line of text identifying the status of that sensor. By displaying the harvest automation application window 800 only on user selection of a function window 502 from the default combine user interface 500 displayed to the operator, the operator need not be distracted with the details of a particular combine function and the multiple sensor status of the app 804. Once alerted to an issue over the simplified function window 502 of default interface 500, however, the operator is still able to use the interface 502 to access the harvest automation application window 800 and quickly drill down to see and act on a more complete detailed view about the particular harvest automated function status in a simplified manner that uses the same LED coloring scheme of the function window 502.

In FIG. 8, the status window 806 of the ground speed automation function illustrates a blue LED 700 for all of the sensors used in the sense function aspect except for the mass flow sensor which shows an amber LED 704 identifying a low confidence signal. Thus, the mass flow sensor is functioning, but in a detected diminished capacity. The combine operator may decide if there is a need to stop the combine and fix the sensor, or if it may be ignored for the time being. The ground speed algorithm used for the decide functional aspect of the function is also illuminated with an amber LED 704 in this example to reflect less than optimal functioning, but still able to proceed in an operational decision process. In either case, the user can then decide whether to press on the diagnostic button adjacent/containing the LED for the particular sense-decide-act feature shown and select the preferences button 808 for the ground speed automation 810 to look at and manually change any settings for each of the functional aspects of the ground speed function, or the user may choose to ignore the warning and keep using the ground speed adjustment automation.

Figure 9:
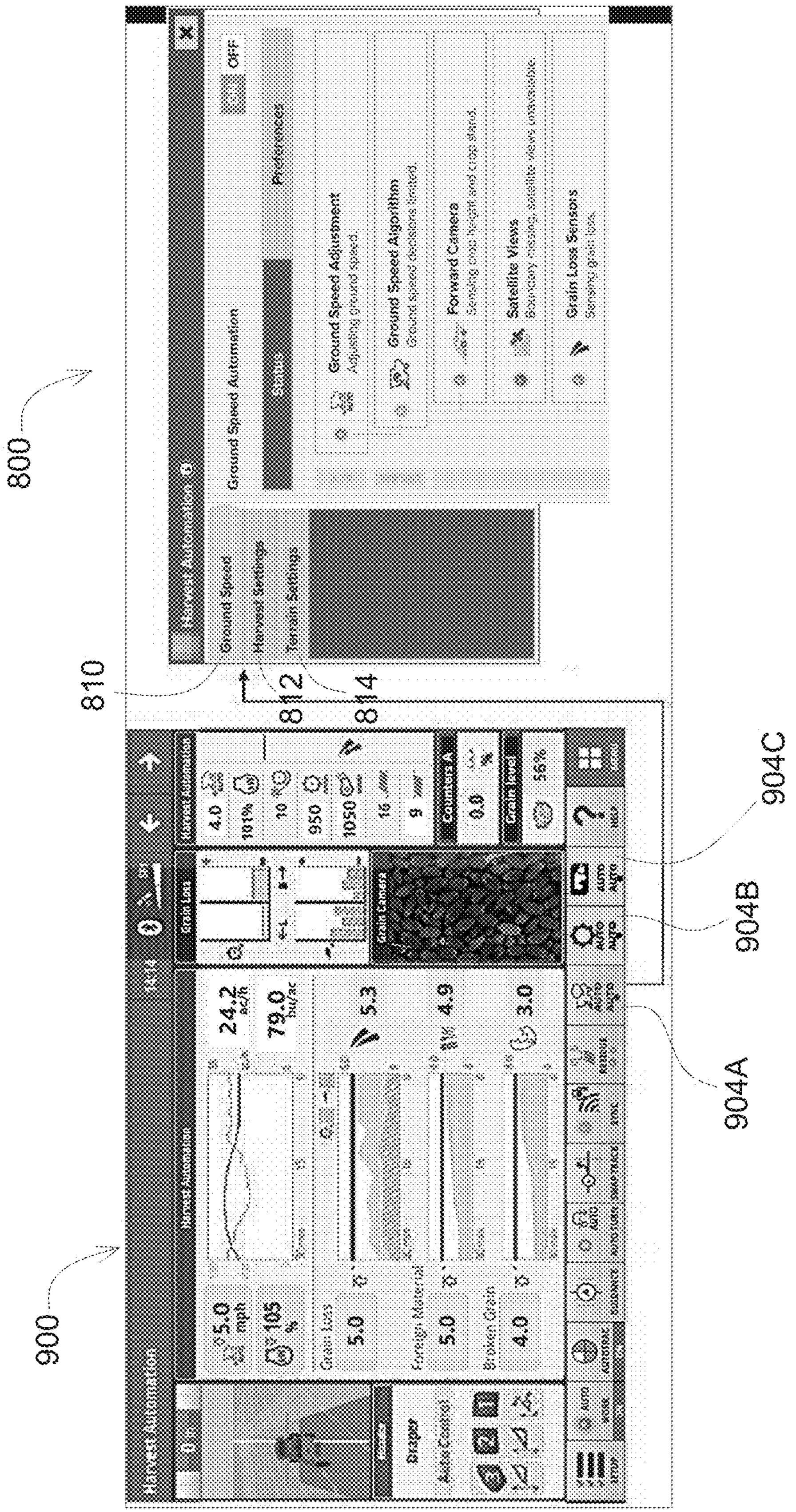
FIG. 9 illustrates an embodiment of an alternate embodiment of the user interface of FIG. 5 having concurrently displayed shortcut keys for available automated functions.

An alternative user interface 900 to the user interface 500 of FIG. 5 is shown in FIG. 9. In the version of user interface 900 shown in FIG. 5, a further simplified version of providing the status of an automated function is provided by displaying separate buttons for all of the available automated harvest functions concurrently, where each button includes an identifying function icon and/or text, and a single LED and/or text status indicator on that button. The single LED effectively collapses the separate sense, decide and act status LEDs into a single LED for each function, where the user will see a warning LED color (see LED color map of FIG. 7) if any one of the sense, decide and act aspects of the identified automated function is in need of attention. The same automated functions as provided in FIG. 8 are represented in FIG. 9, specifically ground speed automation via button 904A, a harvest setting automation via button 904B and a terrain automation function via button 904C. Selection of the ground speed button 904A on the interface 900 reveals the same harvest automation application window 800 is accessible through selection of the related button (904A) as described for FIG. 8. The interface 900 embodiment of FIG. 9 can provide an even greater uncluttered and simplified view than the version of FIG. 8 by collapsing the separate sense, decide and act LEDs into a single LED for the given function, while allowing concurrent views of all the functions concurrently.

Figure 10:
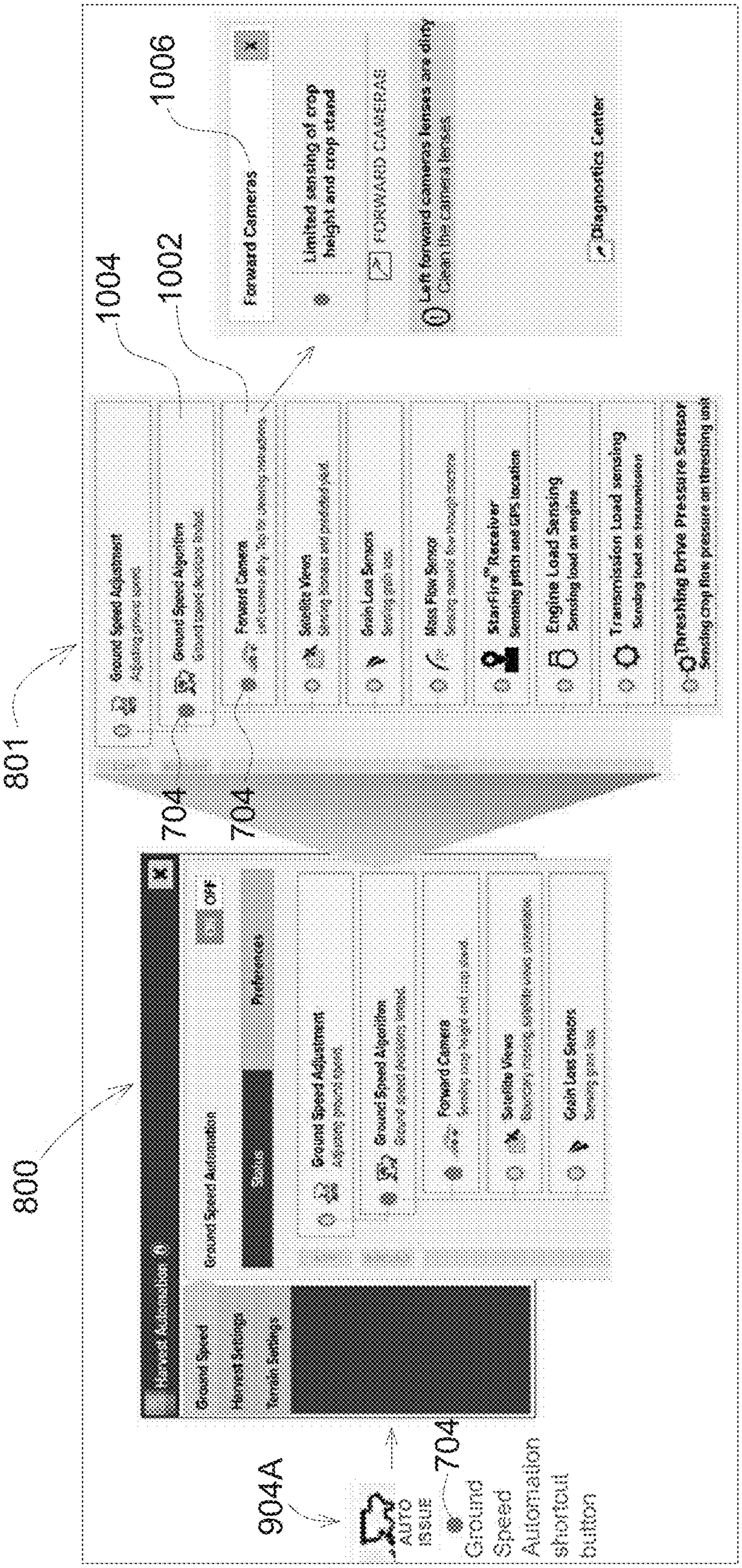
FIG. 10 illustrates a user interface screen display and access path for a hypothetical scenario where a ground speed automation function indicates a status issue via a shortcut key.

FIG. 10 illustrates a user interface screen display and access path for a hypothetical scenario where the ground speed automation button 904A of the user interface 900 senses an issue with the function and displays an amber LED 704 and the text phrase "ISSUE". As noted in the color code table of FIG. 7, an amber LED 704 indicates that the system has sensed that it could be doing a better performing the automated function and that action to resolve it can be taken by the user. When the user then selects the ground speed automation button 904A, the harvest automation application window 800 appears having the panel of three function selector buttons (ground speed 810, harvest settings 812, terrain settings 814), with the ground speed button selected and displaying the sense (with individual sensor status LEDs), decide (with algorithm status LED) and act (with function adjustment status LED) buttons in a scrollable manner. The Forward Camera button 1002 and Ground Speed Algorithm button 1004 in the window 800 are both identified with amber LEDs 704 in this example to illustrate an issue notification for those items, while the remaining status LEDs for all other buttons show blue LEDs 700 indicating fully engaged and functioning status of those items.

Although the more detailed information on the sense decide and act aspects of the ground speed automation function are scrollable in harvest automation application window 800, an expanded view 801 of all of the sensor buttons accessible by scrolling through harvest automation application window 800 is also shown for convenience in FIG. 10. Additionally, use selection of the FORWARD CAMERA button 1002 is shown in FIG. 10 with the resulting display of a more detailed view status screen 1004 on the status of the problematic forward camera. In this example, the detailed view status screen 1006 provides textual explanation of what issue the forward sensor is experiencing and a suggestion for how to rectify the issue.

One possible alternative ground speed function scenario could include a user interface warning message that indicates a red LED 706 on sensing aspect of the function window 502 for the ground speed function, an amber LED 704 for the deciding function aspect, and a blue 700 LED for the acting function. Selecting the harvest function app and the ground speed status screen, details on the failed sensor (satellite view) and the fact that the system considers its decision-making process somewhat less confident, but its ability to continue operating is shown. Again, the user may then select preferences to make any adjustments, or may choose to accept that the automation may not be functioning as well as it could be, but sufficient to continue in automated mode.

Figure 11:
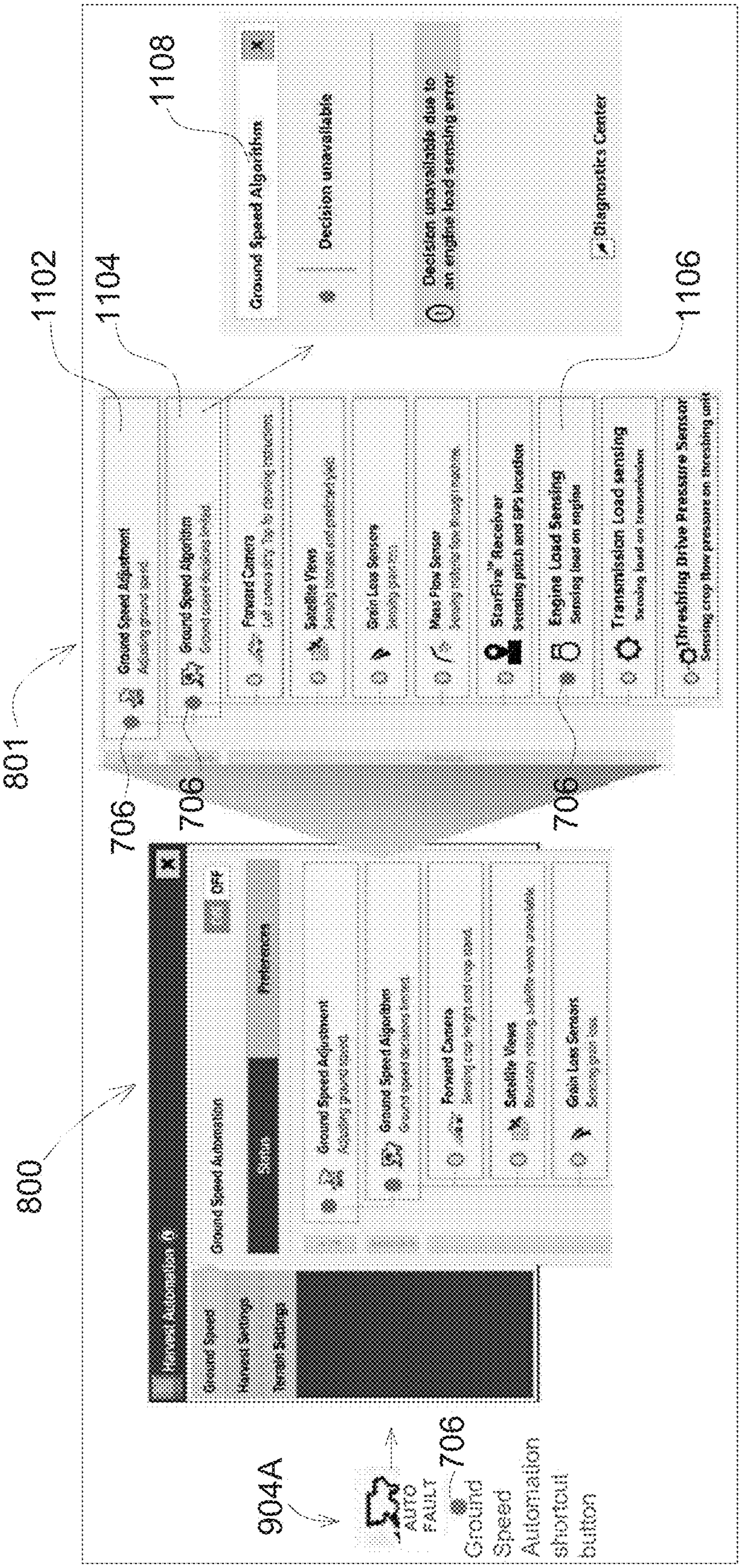
FIG. 11 illustrates a version of the user interface screen and access path of FIG. 10 for a hypothetical scenario where the ground speed automation indicates a status fault via the shortcut key.

FIG. 11 illustrates a user interface screen display and interface access path for a hypothetical scenario where the ground speed automation button 904A of the user interface 900 senses a fault with the function and displays a red LED 706 and the text phrase "FAULT". As noted in the color code table of FIG. 7, a red LED 704 indicates that the system has sensed a fault where the sending, deciding or acting cannot be performed. When the user then selects the ground speed automation button 904A, the harvest automation application window 800 appears having the panel of three function selector buttons (ground speed 810, harvest settings 812, terrain settings 814), with the ground speed button selected and displaying the sense (with individual sensor status LEDs), decide (with algorithm status LED) and act (with function adjustment status LED) buttons in a scrollable manner. In this example situation, the Ground Speed Adjustment button 1102 (act aspect of automated function) and Ground Speed Algorithm button 1104 (decide aspect of automated function) in the window 800 are both identified with red LEDs 706, along with the Engine Load Sensing in the expanded view 801 of sensor status buttons (sense aspect of automated function) accessible via the window 800 and its red LED 706 illustrate a fault for the identified aspects of the Ground Speed function. The fault comprising an inability of the system to perform the specifically identified aspect of sensing, deciding or acting for the Ground Speed function. The remaining status LEDs for all other buttons shown in the expanded view 801 of this example situation display blue LEDs 700 indicating fully engaged and functioning status of those items. Due to the presence of the faults shown by the red LEDs 706, the operator of the combine needs to perform those aspects of the function manually or fix the faults before proceeding.

Figure 12:
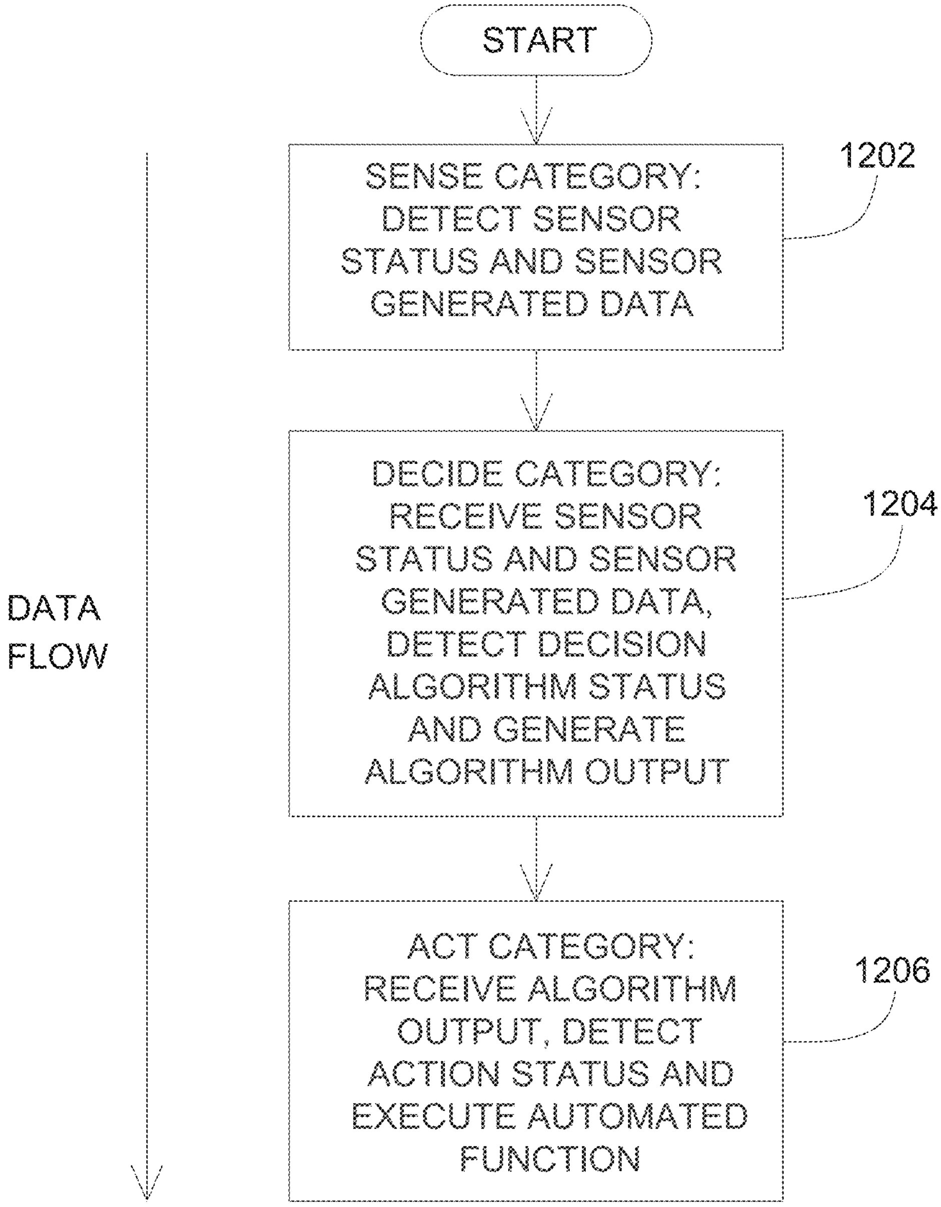
FIG. 12 illustrates one example of a data flow managed by the processor(s) on the combine systems that supports the sense-decide-act information paradigm presented to the combine operator.

Referring now to FIGS. 12-16, methods of using the hardware of FIGS. 1-4 to implement the sense-decide-act interface embodiments, such as disclosed in FIGS. 5-11, are described. FIG. 12 illustrates one example of a data flow managed by the processor(s) on the combine systems that supports the sense-decide-act information paradigm presented to the combine operator. For each automated function, in the "sense" stage of the process the sensors on the combine, and/or those on attachments to the combine are monitored to detect operational status and to gather data currently being generated by those sensors (at 1202). At the "decide" stage of the process, the sensor status information and sensor data generated by the sensors is received at the processor(s) and then applied to the one or more algorithms associated with each particular automated function. Additionally, any algorithm output and algorithm operational status are generated for each algorithm (at 1204). Finally, for the "act" stage of the sense-display-act paradigm, the processor identifies any commands or other output from the algorithms in the decide stage, along with any detected sensor and/or algorithm status information and executes the action part of the automated function (e.g., automatically making adjustments to the ground speed of the combine for the automate ground speed function) and generates the "act" stage status information for display (at 1206).

Figure 13:
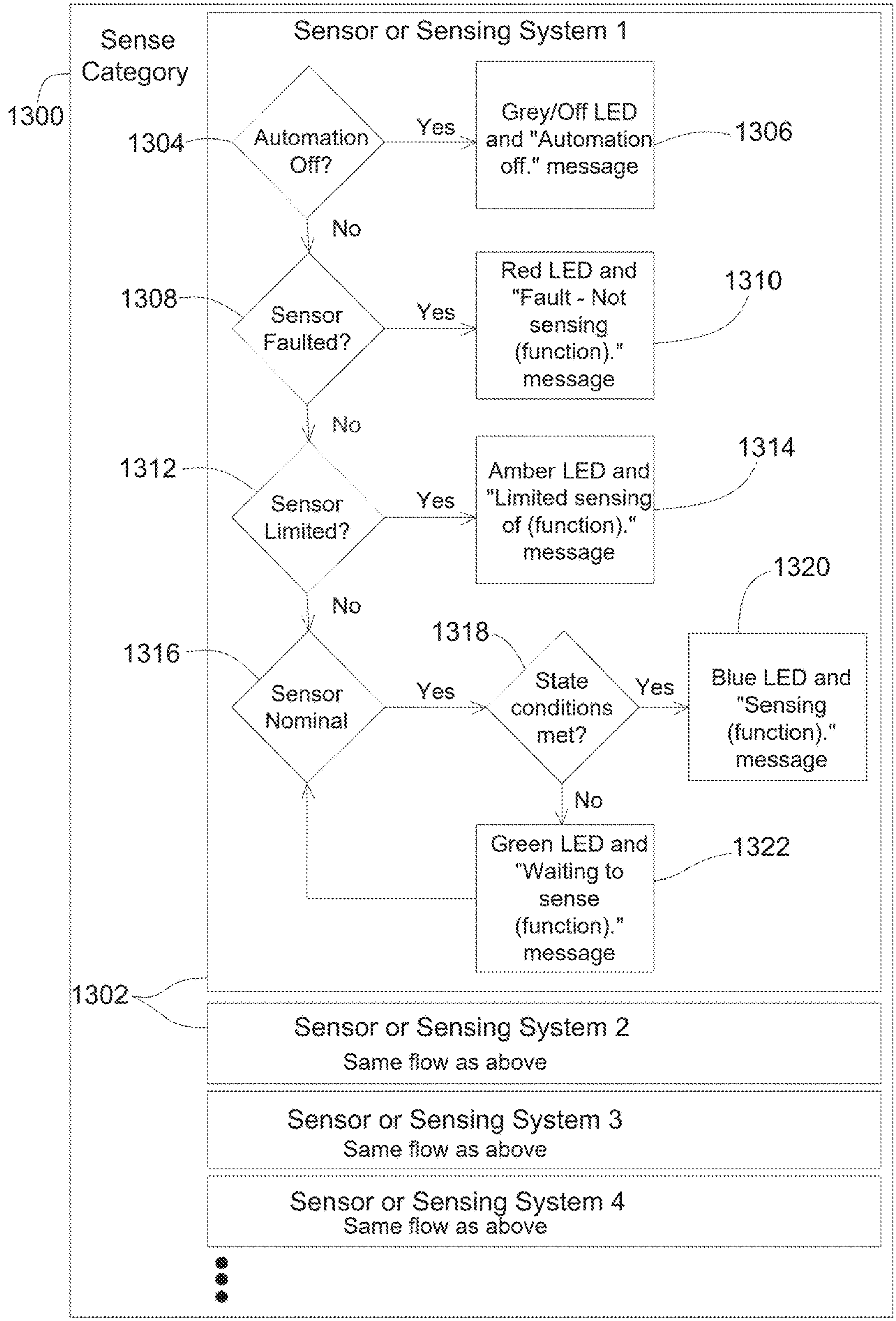
FIG. 13 is a flow diagram illustrating a process for detecting and displaying sensor status for a particular automated function supported by a combine vehicle.
Figure 14:
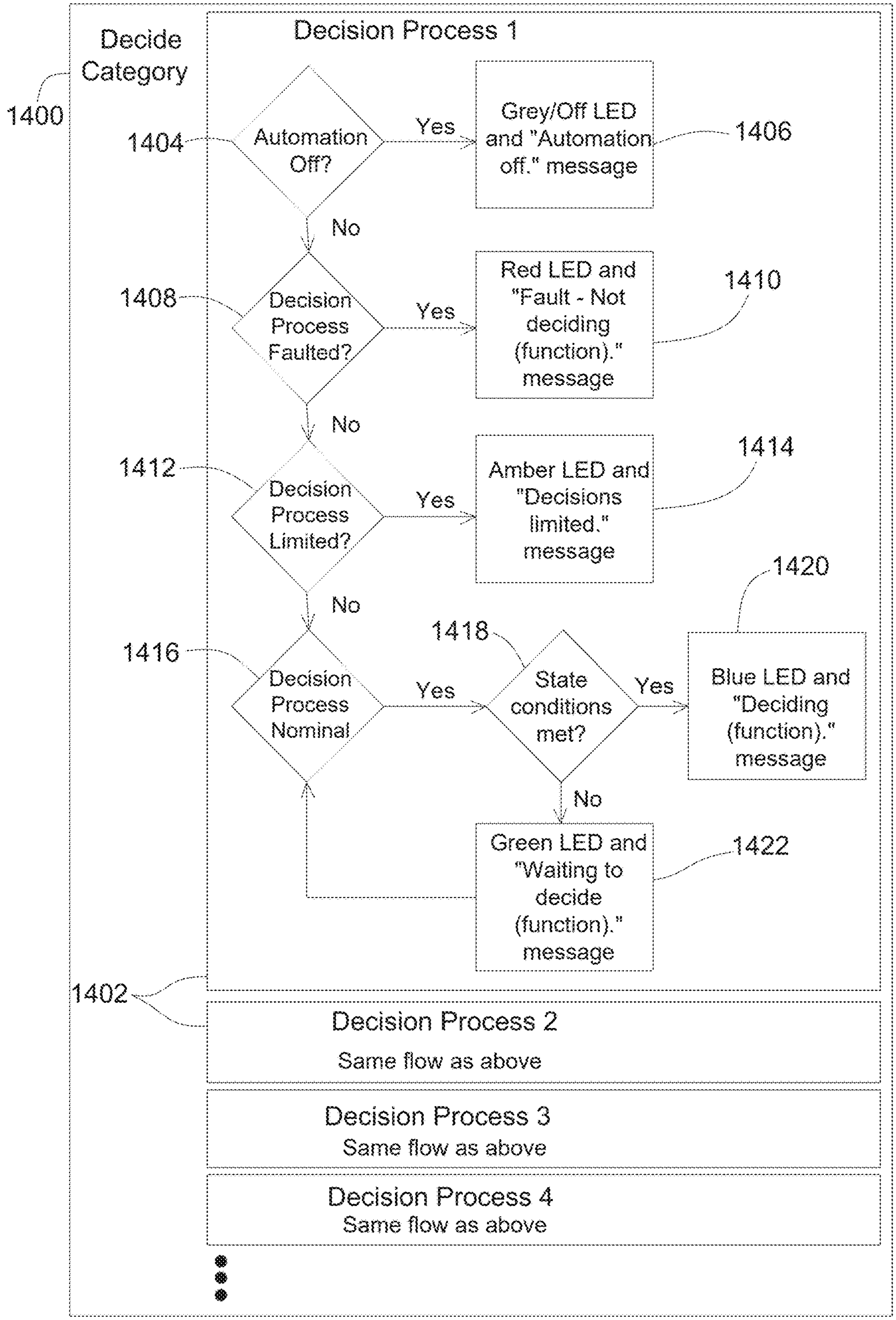
FIG. 14 is a flow diagram illustrating a process for detecting and displaying the status of one or more algorithms for a decision aspect particular automated function supported by the combine vehicle that uses the sensor information of FIG. 13.
Figure 15:
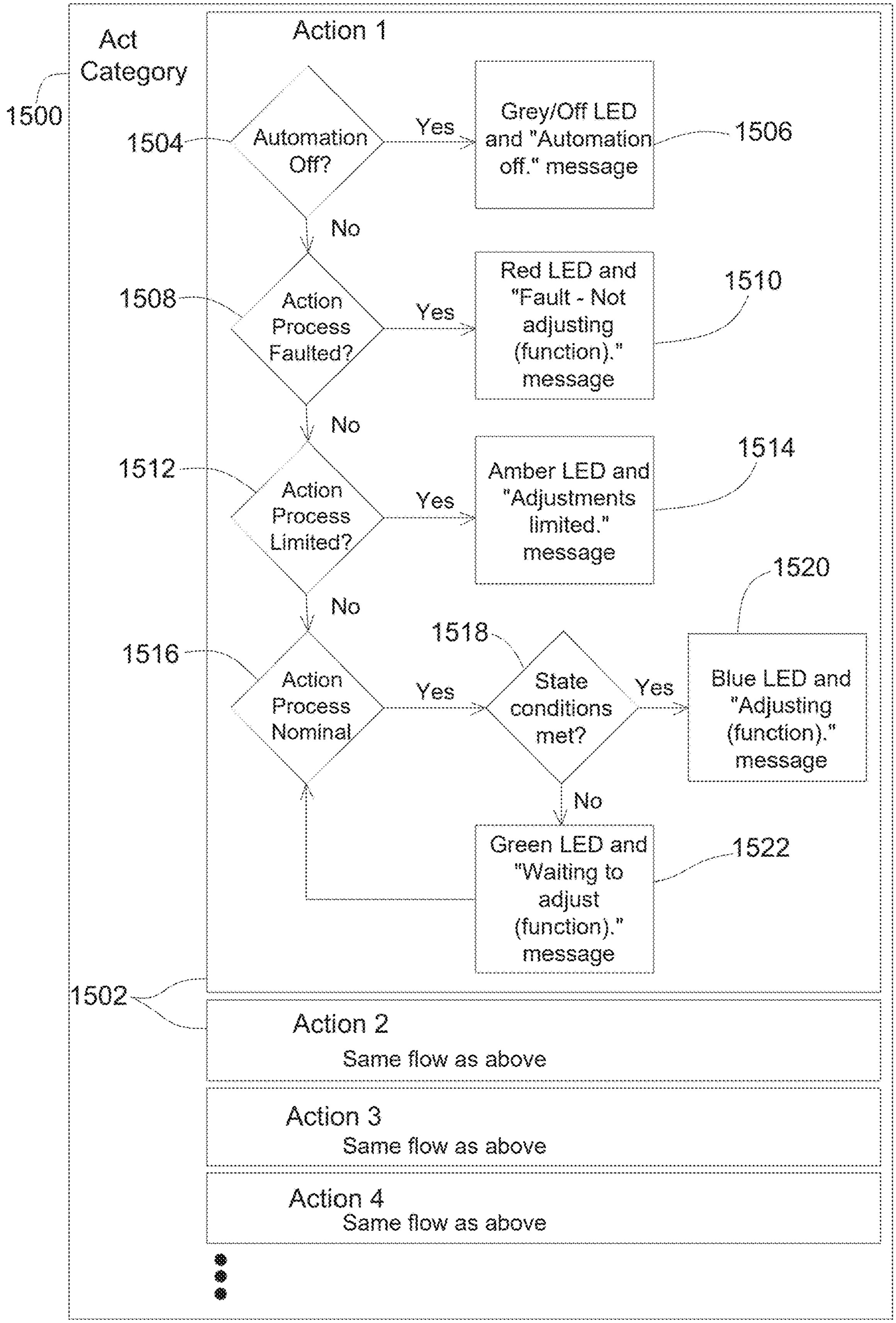
FIG. 15 is a flow diagram illustrating a process for detecting and displaying the status of one or more actions for a particular automated function supported by the combine vehicle that uses the sensor information of FIG. 13 and decision information of FIG. 14.

FIGS. 13-15 are flow charts illustrating the status detection and display logic for each of the sense category (1300), decide category (1400) and act category (1500) aspects of a particular automated function capability on the combine. Referring to FIG. 13, for each sensor 1302 associated with the particular automated function, the logic flow executed by the processor of the system first determines of the particular automated function is currently set to be off (at 1304) and, when the automation is determined to be off, generates a gray or clear LED 708 signal and an "Automation off" message (at 1306). If the automation is not off, the system then determines if the sensor is faulted (at 1308) and, when the sensor is faulted, generates a red LED 706 signal and a "Fault-Not deciding <function>" message (at 1310). If the automation is on and the sensor is not faulted, then the system checks to see whether the sensor is operating in only a limited capacity where the output of the sensor is in doubt or questionable (at 1312) and, when the system does determine that the sensor output is limited in some manner, generates an amber LED 704 signal and a "Limited sensing of <function>" message (at 1310). When the sensor operation is not detected as limited, the system then determines if the sensor 1302 is in a fully operational or "nominal" state (at 1318). If the sensor is nominal and the operator has selected and engaged the function associated with the particular sensor (at 1318), then the system generates a blue LED 700 signal and a "Sensing <function>" message (at 1320). However, if the system detects that the operator has not selected and engaged the function associated with the particular sensor (at 1318), the system instead generates a green LED 702 signal and a "Waiting to sense <function>" message (at 1322). This same process is repeated for every sensor 1302 that is associated with the given function. There may be only one sensor 1302, or a plurality of sensors 1302, associated with a particular automated function. Also, as noted above, the same sensor may be used as part of more than one different automated function.

Referring to now to FIG. 14, for each decision process associated with the particular automated function there is logic flow executed by the processor of the system to determine and report the status of the decide category 1400. As with the sense category 1300 logic flow of FIG. 13, for each decision process 1402 in an automated function the processor of the system first determines if the particular automated function is currently set to be off (at 1404) and, when the automation is determined to be off, generates a gray or clear LED 708 signal and an "Automation off" message (at 1406). If the automation is not off, the system then determines if the decision process is faulted (at 1408) and, when the sensor is faulted, generates a red LED 706 signal and a "Fault-Not deciding <function>" message (at 1410). If the automation is on and the decision process is not faulted, then the system checks to see whether the decision process is operating in only a limited capacity where the output of the decision process is in doubt or questionable (at 1412) and, when the system does determine that the decision process output is limited in some manner, generates an amber LED 704 signal and a "Decisions limited" message (at 1410). When the decision process operation is not detected as limited, the system then determines if the decision process 1402 is in a fully operational or "nominal" state (at 1418). If the decision process is nominal and the operator has selected and engaged the function associated with the particular decision process (at 1418), then the system generates a blue LED 700 signal and a "Deciding <function>" message (at 1420). However, if the system detects that the operator has not selected and engaged the function associated with the particular decision process (at 1418), the system instead generates a green LED 702 signal and a "Waiting to decide <function>" message (at 1422). This same process is repeated for every decision process 1402 that is associated with the given function. There may be only one decision process 1402, or a plurality of decision processes 1402, associated with a particular automated function.

Referring to now to FIG. 15, for each action associated with the particular automated function there is logic flow executed by the processor of the system to determine and report the status of the act category 1500. Again, as with the sense category 1300 logic flow of FIG. 13, for each action process 1502 in an automated function the processor of the system first determines if the particular automated function is currently set to be off (at 1504) and, when the automation is determined to be off, generates a gray or clear LED 708 signal and an "Automation off" message (at 1506). If the automation is not off, the system then determines if the action process is faulted (at 1508) and, when the action is faulted, generates a red LED 706 signal and a "Fault-Not adjusting <function>" message (at 1510). If the automation is on and the action process is not faulted, then the system checks to see whether the action process is operating in only a limited capacity where the output of the action process is in doubt or questionable (at 1512) and, when the system does determine that the action process is limited in some manner, generates an amber LED 704 signal and a "Adjustments limited" message (at 1510). When the action process operation is not detected as limited, the system then determines if the action process 1502 is in a fully operational or "nominal" state (at 1518). If the action process is nominal and the operator has selected and engaged the function associated with the particular action process (at 1518), then the system generates a blue LED 700 signal and a "Adjusting <function>" message (at 1520). However, if the system detects that the operator has not selected and engaged the function associated with the particular action process (at 1518), the system instead generates a green LED 702 signal and a "Waiting to adjust <function>" message (at 1522). This same process is repeated for every action process 1502 that is associated with the given function. There may be only one action 1502, or a plurality of actions 1502, associated with a particular automated function.

As noted above in the different user interface embodiments 500, 900 of FIGS. 5 and 9, the simplified status information and messages may be provided in a number of ways on the display of the combine operator. When the user interface 500 having a harvest automation status window 502 for displaying the sense, decide and act performance capabilities of a selectable one of the harvest automation functions available, the generated LED signal generated for each of the of the acting, deciding and sensing aspects, as noted in the logic of FIGS. 13-15, are displayed for each automated function (see FIG. 6, for example). When there is more than one sensor, decision process or action process for a given automated function, the LED color displayed next to the "Acting", "Deciding" and "Sensing" text in the automated function window may take the color of the highest priority LED color determined by the system for that aspect. In one embodiment, the priority of colors, from highest to lowest priority and using the color scheme of FIG. 7, correspond to 1) Gray/Clear (automation off); 2) Red (fault); 3) Amber (limited); 4) Green (waiting for automated function to be engaged); and Blue (automated function engaged and aspect nominal). In different embodiments, the Gray/Clear LED color can be either automation off or an indication that the system does not support current conditions. For example, the LED color of Gray/Clear may represent that a type of crop currently being harvested is not supported by the automation or may represent to the user that their current automation subscription status has expired. Similarly, the greater compressed information display of the alternative automated function shortcut buttons (904A, 904B and 904C in the example of FIG. 9) which have only a single LED shown for showing status of the entire automated function, rather than separate sense, decide and act LEDs for each automated function, is displayed based on the above-noted color display priority.

Although some features are shown stored in computer-readable memories (e.g., as logic implemented as computer-executable instructions or as data structures in memory), all or part of the system and its logic and data structures may be stored on, distributed across, or read from other types of machine-readable storage media. The computer-readable storage media may include memories, hard disks, floppy disks, CD-ROMs, or any other type of storage medium or storage media.

The processing capability of the system 200 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs, modules, or circuitry, may be combined or split among multiple programs, distributed across several memories and processors, and may be implemented in a library, such as a shared library (e.g., a dynamic link library (DLL)).

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM. The computer-readable storage media may be non-transitory computer-readable media, which includes CD-ROMs, volatile or non-volatile memory such as ROM and RAM, or any other suitable storage device. Moreover, the various modules and screen display functionality is but one example of such functionality and any other configurations encompassing similar functionality are possible.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture consistent with the innovation may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A method for providing diagnostic information to an end user of an off-road vehicle, the method comprising:

determining a set of sensors or components that are required for an automated system of the off-road vehicle to perform an automated function at each of a plurality of predetermined automated system functional levels, wherein the automated function includes automation components comprising a sensing automation component, a deciding automation component, and an acting automation component;

evaluating an operational status of the determined set of sensors or components;

determining whether the evaluated operational status of any required sensor or components falls below a first threshold required for a higher functional level;

determining whether the evaluated operational status of any required sensor or component is equal to or greater than a second threshold required for a lower functional level;

displaying or indicating to the end user on a user interface, for each of the automation components, a maximum functional level of the required sensor or components of the automated system among the first threshold and the second threshold;

generating an alert message on the user interface of the off-road vehicle when the maximum functional level of the automated system is lower than required for a proper minimum functional level; and disabling the automated system when the maximum functional level of the automated system is lower than required for a proper minimum functional level.

2. The method according to claim 1, wherein the user interface of the off-road vehicle is remotely located from the off-road vehicle.

3. The method according to claim 1, further comprising:

determining at least one algorithm that is required for the automated system of the off- road vehicle to function at each of a plurality of predetermined automated system functional levels;

evaluating an operational status of the determined at least one algorithm;

determining whether the evaluated operational status of the determined at least one algorithm falls below a first threshold required for a higher functional level;

determining whether the evaluated operational status of the determined at least one algorithm is equal to or greater than a second threshold required for a lower functional level; and displaying or indicating to the end user a maximum functional level of the determined at least one algorithm of the automated system among the higher threshold and the lower threshold.

4. The method according to claim 3, further comprising:

determining at least one action implementation that is required for the automated system of the off-road vehicle to function at each of a plurality of predetermined automated system functional levels;

evaluating an operational status of the determined at least one action implementation;

determining whether the evaluated operational status of the determined at least one action implementation falls below a first threshold required for a higher functional level;

determining whether the evaluated operational status of the determined at least one action implementation is equal to or greater than a second threshold required for a lower functional level; and displaying or indicating to the end user a maximum functional level of the determined at least one action implementation of the automated system among the higher threshold and the lower threshold.

5. The method of claim 3, wherein the off-road vehicle comprises a combine.

6. The method of claim 5 wherein the automated system comprises a plurality of automated combine functions, and wherein each of the automated combine functions utilize a respective set of one or more of the sensors, algorithms and action implementations.

7. The method of claim 1, wherein:

the sensing automation component comprises tracking statuses corresponding to the set of sensors or components;

the deciding automation component comprises processing data associated with the set of sensors or components; and the acting automation component comprises a status of execution or adjustment of the automated function.

8. A non-transitory computer-readable storage medium comprising instructions executable by a processor for providing diagnostic information to an end user of an off-road vehicle, the instructions comprising:

instructions executable to determine a set of sensors or components that are required for an automated system of the off-road vehicle to perform an automated function at each of a plurality of predetermined automated system functional levels, wherein the automated function includes automation components comprising a sensing automation component, a deciding automation component, and an acting automation component;

instructions executable to evaluate an operational status of the determined set of sensors or components;

instructions executable to determine whether the evaluated operational status of any required sensor or components falls below a first threshold required for a higher functional level;

instructions executable to determine whether the evaluated operational status of the determined set of sensors or components is equal to or greater than a second threshold required for a lower functional level;

instructions executable to display or indicate to the end user on a user interface, for each of the automation components, a maximum functional level of the determined set of sensors or components of the automated system among the higher functional level and the lower functional level;

instructions executable to generate an alert message on the user interface of the off-road vehicle when the maximum functional level of the automated system is lower than required for a proper minimum functional level; and instructions executable to disable the automated system when the maximum functional level of the automated system is lower than required for a proper minimum functional level.

9. The non-transitory computer-readable storage medium according to claim 8, wherein the user interface of the off-road vehicle is remotely located from the off-road vehicle.

10. The non-transitory computer-readable storage medium according to claim 8, further comprising:

instructions executable to determine at least one algorithm that is required for the automated system of the off-road vehicle to function at each of a plurality of predetermined automated system functional levels;

instructions executable to evaluate an operational status of the determined at least one algorithm;

instructions executable to determine whether the evaluated operational status of the determined at least one algorithm falls below a first threshold required for a higher functional level;

instructions executable to determine whether the evaluated operational status of the determined at least one algorithm is equal to or greater than a second threshold required for a lower functional level; and instructions executable to display or indicate to the end user a maximum functional level of the determined at least one algorithm of the automated system among the higher threshold and the lower threshold.

11. The non-transitory computer-readable storage medium according to claim 10, further comprising:

instructions executable to determine at least one action implementation that is required for the automated system of the off-road vehicle to function at each of a plurality of predetermined automated system functional levels;

instructions executable to evaluate an operational status of the determined at least one action implementation;

instructions executable to determine whether the evaluated operational status of the determined at least one action implementation falls below a first threshold required for a higher functional level;

instructions executable to determine whether the evaluated operational status of the determined at least one action implementation is equal to or greater than a second threshold required for a lower functional level; and instructions executable to display or indicate to the end user a maximum functional level of the determined at least one action implementation of the automated system among the higher threshold and the lower threshold.

12. The non-transitory computer-readable storage medium of claim 8, wherein:

the sensing automation component comprises tracking statuses corresponding to the set of sensors or components;

the deciding automation component comprises processing data associated with the set of sensors or components; and the acting automation component comprises a status of execution or adjustment of the automated function.

13. A system for providing diagnostic information to an end user of an off-road vehicle, the system comprising:

a set of sensors or components that are required for an automated system of the off-road vehicle to perform an automated function at each of a plurality of predetermined automated system functional levels, wherein the automated function includes automation components comprising a sensing automation component, a deciding automation component, and an acting automation component;

a display device accessible to the end user;

a processor in communication with the set of sensors and the display device;

a memory in communication with the processor and storing computer readable instructions executable by the processor for providing the diagnostic information; and wherein the processor is configured by the computer readable instructions to:

evaluate an operational status of the set of sensors;

determine whether the evaluated operational status of any of the set of sensors falls below a first threshold required for a higher functional level;

determine whether the evaluated operational status of the set of sensors is equal to or greater than a second threshold required for a lower functional level;

display on the display device to the end user, for each of the automation components, a maximum functional level of the set of sensors of the automated system based on the determination of whether the evaluated operational status is below the first threshold, or is equal to or greater than the second threshold;

generate an alert message on the user interface of the off-road vehicle when the maximum functional level of the automated system is lower than required for a proper minimum functional level; and disable the automated system when the maximum functional level of the automated system is lower than required for a proper minimum functional level.

14. The system according to claim 13, wherein the display of the off-road vehicle is remotely located from the off-road vehicle.

15. The system according to claim 13, wherein the processor is further configured by the computer readable instructions to:

determine at least one algorithm that is required for the automated system of the off-road vehicle to function at each of a plurality of predetermined automated system functional levels;

evaluate an operational status of the determined at least one algorithm;

determine whether the evaluated operational status of the determined at least one algorithm falls below the first threshold required for a higher functional level;

determine whether the evaluated operational status of the determined at least one algorithm is equal to or greater than the second threshold required for a lower functional level; and display or indicate to the end user a maximum functional level of the determined at least one algorithm of the automated system.

16. The system according to claim 15, wherein the processor is further configured by the computer readable instructions to:

determine at least one action implementation that is required for the automated system of the off-road vehicle to function at each of a plurality of predetermined automated system functional levels;

evaluate an operational status of the determined at least one action implementation;

determine whether the evaluated operational status of the determined at least one action implementation falls below the first threshold required for a higher functional level;

determine whether the evaluated operational status of the determined at least one action implementation is equal to or greater than the second threshold required for a lower functional level; and display or indicate to the end user a maximum functional level of the determined at least one action implementation of the automated system among the first threshold and the second threshold.

17. The system of claim 13, wherein the off-road vehicle comprises a combine.

18. The system of claim 17, wherein the automated system comprises a plurality of automated combine functions, and wherein each of the automated combine functions utilize a respective set of one or more of the sensors, algorithms and action implementations.

19. The system of claim 18, wherein a plurality of automated combine systems associated with the plurality of automated combine functions includes a ground speed automation system, a harvest setting automation system and a terrain settings automation system, and wherein at least one of the one or more sensors is shared by two of the automated combine systems.

20. The system of claim 13, wherein:

the sensing automation component comprises tracking statuses corresponding to the set of sensors or components;

the deciding automation component comprises processing data associated with the set of sensors or components; and the acting automation component comprises a status of execution or adjustment of the automated function.

* * * * *